United States Patent
Strussion et al.

(10) Patent No.: US 6,367,278 B1
(45) Date of Patent: *Apr. 9, 2002

(54) PORTABLE EVAPORATIVE COOLING APPARATUS

(75) Inventors: Christopher J. Strussion, 66059 McGregor Rd., Bellaire, OH (US) 43906; Thomas Strussion, Bellaire, OH (US)

(73) Assignee: Christopher J. Strussion, Bellaire, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/757,372

(22) Filed: Jan. 9, 2001

Related U.S. Application Data

(63) Continuation of application No. 09/400,523, filed on Sep. 20, 1999, now Pat. No. 6,182,463, which is a continuation-in-part of application No. 09/140,567, filed on Aug. 27, 1998, now Pat. No. 6,112,538.

(51) Int. Cl.[7] .................................................. F28D 5/00
(52) U.S. Cl. .......................................... 62/314; 62/304
(58) Field of Search ........................ 62/304, 310, 314, 62/259.1, 259.4; 261/24, 26, 28

(56) References Cited

U.S. PATENT DOCUMENTS

| | | | |
|---|---|---|---|
| 2,199,485 A | * 5/1940 | De Vout | |
| 2,769,620 A | 11/1956 | Davison | |
| 3,911,060 A | * 10/1975 | Bradley, Jr. et al. | ...... 62/314 X |
| 4,223,836 A | 9/1980 | Eager | |
| 4,360,368 A | * 11/1982 | Lyon | ............ 62/314 X |
| 4,682,729 A | 7/1987 | Doman et al. | |
| 4,693,852 A | 9/1987 | Gordon | |
| 4,773,471 A | 9/1988 | Grant et al. | |
| 4,810,268 A | 3/1989 | Chambers et al. | |
| 5,277,655 A | 1/1994 | Storkan et al. | |
| 5,724,824 A | 3/1998 | Parsons | |
| 6,182,463 B1 | * 2/2001 | Strussion et al. | ............ 62/314 |

* cited by examiner

Primary Examiner—Denise L. Esquivel
Assistant Examiner—Chen-Wen Jiang
(74) Attorney, Agent, or Firm—Eschweiler & Associates, LLC

(57) ABSTRACT

A portable evaporative cooling system includes a fan for generating a path of air, a water pump for dispersing water in the path of air generated by the fan, and a water cooler for storing the water. The water cooler has an opening to permit the water pump to draw water therefrom. Support structure supports the fan and water pump and is sized and dimensioned to cooperatively engage the water cooler. The pump pumps the liquid from the cooler in a substantially non-pulsating manner, thereby providing a substantially continuous misting.

4 Claims, 2 Drawing Sheets

PORTABLE EVAPORATIVE COOLING APPARATUS

RELATED APPLICATIONS

This application is a continuation of Ser. No. 09/400,523 filed Sep. 20, 1999 (now U.S. Pat. No. 6,182,463), which is entitled PORTABLE EVAPORATIVE COOLING APPARATUS, which is a continuation-in-part of U.S. Ser. No. 09/140,567 filed Aug. 27, 1998 now (U.S. Pat. No. 6,112,538), which is entitled PORTABLE AIR CONDITIONING APPARATUS AND METHOD USING EVAPORATIVE COOLING.

FIELD OF THE INVENTION

The present invention relates to an evaporative cooling apparatus and, more particularly, to a portable evaporative cooling apparatus that includes a standard water cooler and an adapter for mounting the cooling apparatus to the water cooler.

BACKGROUND OF THE INVENTION

Evaporative coolers are used in a variety of settings including factories, warehouses, workshops and agricultural structures, as well as automobiles, homes, offices, trailers and at the sidelines of sporting events. Evaporative cooling improves workplace productivity by keeping workers cool in the workplace which, in turn, reduces heat-related illness and employee turn-over, particularly in the summer months and/or in hotter climates. It also improves performance of sports players by keeping players cool or preventing heat exhaustion in sports that demand extended periods of physical exertion.

Evaporative coolers require minimal parts and are relatively simple to manufacture and maintain, making them an attractive alternative to conventional air conditioning and mechanical refrigeration systems. Because of their simple construction, the cost of acquiring and operating evaporative coolers is considerably lower than that of conventional air conditioning systems. Moreover, evaporative coolers are especially useful in outside environments, whether open, such as an athletic field, or enclosed, for example, a factory or the like, whereas refrigeration systems in such environments are comparatively inefficient, if not impractical. Evaporative coolers are also economical since they use minimal amounts of energy and environmentally safe since they have no CFCs or HCFCs.

The versatility and other advantages of evaporative coolers have caused manufacturers to explore ways of making them more attractive to a wider range of consumers. One way of doing this is by making evaporative coolers more portable. Heretofore, attempts at improving portability have included, for example, reducing the size of and combining the components of the evaporative cooler into a smaller and more compact system. See, e.g., U.S. Pat. No. 2,769,620, which is illustrative of a typical portable evaporative cooler. Other attempts have included self-containing certain portions of the evaporative cooler, for example, by providing a water source that is remote from, or a separate component of, the evaporative cooler.

Yet another attempt to provide a portable evaporative cooling system is disclosed in U.S. Pat. No. 5,613,371 entitled, "Method and Apparatus for Misting Vehicle Occupants." The '371 patent integrates an evaporative cooling system into a golf cart having the fluid reservoir and other components integrated within the golf cart body. A disadvantage of the system disclosed in the '371 patent is the use of an accumulator system and accompanying solenoid valve. The accumulator is a device which traps air to store energy for supplying water under a substantially constant pressure. The accumulator therefore is implemented to reduce the pulsing of fluid to the mist nozzles caused by the pump. The inclusion of an accumulator and accompanying solenoid further increases the cost and complexity of the system and provides a potential reliability problem since the accumulator reservoir is often an inflatable diaphragm which may puncture or leak during the rugged operation of the golf cart. Alternatively, the accumulator reservoir is a rigid tank which disadvantageously increases the size of the system, making it difficult to incorporate the system into various types or vehicles or applications.

SUMMARY OF THE INVENTION

The present invention provides a portable evaporative cooling system comprising a fan section and a base section. The fan section provides cooled air and the base section permits the fan section to be installed in or onto a variety of different size conventional water and/or food coolers.

According to one aspect of the invention, a portable evaporative cooling apparatus for retrofitting with a water cooler is provided. The cooling apparatus is characterized by a fan for generating a path of air, a spraying system for dispersing water in the path of air generated by the fan for evaporation thereof, and a universal support structure for supporting the fan and spraying system, the support structure being sized and dimensioned to cooperatively engage the water cooler.

According to a preferred embodiment of the invention, the support structure is sized and dimensioned to cooperatively engage an opening in the water cooler. As preferred, the support structure includes a housing and a base portion disposed below the housing, the housing supporting the fan and the base portion being sized and dimensioned to cooperatively engage the water cooler. Still more preferably, the base portion includes a plug shape portion, at least a portion of which fits into an opening of the water cooler. In particular, the plug shape portion may comprise an inverted frustoconical shape portion that is adapted to fit into a round shape opening of the water cooler.

According to a preferred embodiment of the invention, the base portion includes a shoulder that rests on a perimeter of an opening of the water cooler.

According to another preferred embodiment of the invention, the spraying system includes a water pump in fluid communication with the water cooler for drawing water therefrom. Preferably, the spraying system includes one or more misting nozzles disposed downstream of the fan and in the path of air generated therefrom.

According to yet another aspect of the present invention, the cooling system includes a pump which provides fluid to the one or more nozzles in a substantially non-pulsating manner. Therefore the present invention eliminates the need for an accumulator and solenoid, thus greatly simplifying and reducing the cost of the system over the prior art. According to a preferred embodiment of the present invention, the pump operates in a substantially non-pulsating mode by use of a bypass valve associated with the pump. The bypass valve operates to pass fluid from the pump inlet to the pump outlet when the outlet pressure increases above a predetermined level, thus maintaining the outlet fluid pressure relatively constant.

According to another preferred embodiment of the invention, the spraying system includes a manifold and one or more nozzles extending therefrom, wherein the manifold and nozzles are attached to a radially extending support structure to permit radial adjustment thereof. Preferably, there are a plurality of nozzles and the plurality of nozzles are equally spaced relative to a cross sectional area defined by the path of air generated by the fan. The manifold preferably conveys the water in equal amounts to the nozzles.

According to another aspect of the invention, a portable evaporative cooling apparatus for retrofitting with any of a variety of different size water coolers is provided. The cooling apparatus is characterized by a fan for generating a path of air and a plurality of misting nozzles disposed downstream of the fan for dispersing water in the path of air generated from the fan for evaporating the water. A housing supports the fan and plurality of nozzles. A water pump pumps water from the water cooler to the plurality of nozzles. A universal base portion supports the water pump. The base portion is disposed below and connected to the housing and is sized and dimensioned to cooperatively engage any of the variety of different size water coolers.

According to yet another aspect of the invention, a portable evaporative cooling system is provided. The cooling system is characterized by a water cooler having an opening and means for providing cooling. The cooling means is operative to draw water from the water cooler. A plug is adapted to fit into the opening of the cooler and connect the cooling means thereto.

The present invention provides several advantages over known portable cooling apparatuses. The cooling apparatus of the present invention is universally usable with a variety of different sized water coolers. The cooling apparatus is separate from the water cooler and, therefore, simplifies transportation of the components by allowing them to be transported separately. Because of its universality, the cooling apparatus of the present invention may be used in a variety of applications and environments, including both indoor and outdoor settings, to achieve convenient and easy-to-set-up cooling.

Although the invention is shown and described with respect to one or more preferred embodiments, it is to be understood that equivalents and modifications will occur to others skilled in the art upon the reading and understanding of the specification. The present invention includes all such equivalents and modifications.

DETAILED DESCRIPTION

Figure 1:
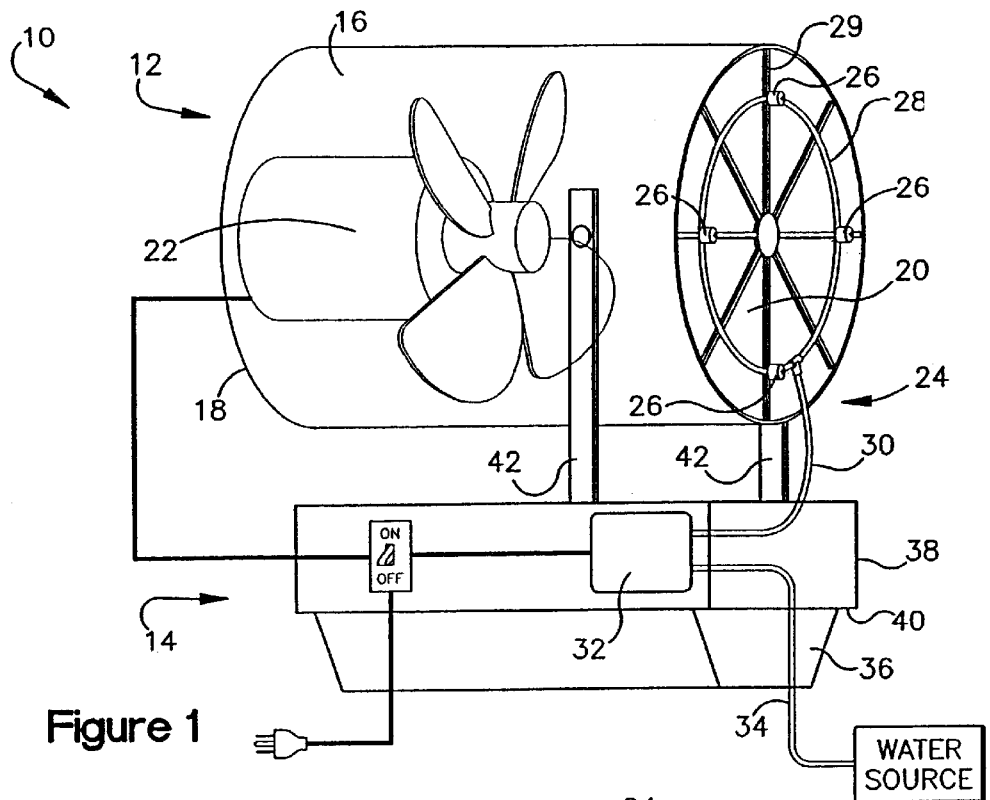
FIG. 1 is a schematic side elevational view of a portable evaporative cooler apparatus in accordance with the present invention.

Referring now in detail to the drawings, an evaporative cooling apparatus in accordance with the present invention is designated generally by reference numeral 10. The cooling apparatus 10 includes an upper fan section 12 and a lower universal base, or adapter, section 14. The fan section 12 provides the cooling function of the apparatus 10. The base section 14 supports the fan section 12 and is adapted to be releasably mounted to a standard-sized, easily available water or food cooler such as used, for example, at picnics or on the sidelines of sporting events. As shown in the illustrated exemplary embodiment, the universal base section 14 forms an inverted frustoconical shaped bottom portion that will easily seat within a variety of different sized barrel type water coolers having a round shaped opening. According to the present invention, the evaporative cooling apparatus 10 may be used in connection with any number of existing water or food coolers, making the cooling apparatus 10 universally applicable in environments in which those coolers are commonly used. The evaporative cooling apparatus 10 is described in greater detail below.

Referring then to FIG. 1, the fan section 12 of the cooling apparatus 10 includes a protective housing 16 that has an upstream, air intake end 18 where ambient air is drawn into the housing 16, and a downstream, or discharge, end 20 where cooled air is discharged from the housing 16. The housing 16 preferably is constructed of a durable, yet corrosion resistant material such as polyethylene or some other suitable polymeric material. As preferred, the housing 16 is cylindrically shaped and has an internal diameter of slightly greater than 12 inches.

The housing 16 supports a fan, or blower 22, therein preferably located at its upstream end 18 and a spraying device 24 at its downstream end 20. In the illustrated embodiment it will be appreciated that the fan 22 pushes air through the housing 16 through a "water screen" emitted by the spraying device 24 whereby, as described in greater detail below, the air is cooled. In an alternative embodiment, the fan 22 may be disposed at the downstream end 20 and the spraying device 24 at the upstream end 18 so that the fan 22 draws, or pulls, the air through the water screen and the cooled air through the housing 16. Such an alternative is contemplated as falling within the scope of the present invention.

The fan 22 is preferably constructed of materials that are resistant to moisture. The fan 22 includes a plurality of blades and has an overall blade width of about 12 inches so as to provide sufficient operating clearance between the fan 22 and the internal wall of the housing 16. The fan 22 includes a fan motor that may be a multi-speed or variable speed motor depending on the desired flexibility in the volumetric flow rate of a particular cooling application. The fan motor is preferably powered by 110 VAC line power although any suitable source of power may be used, for example, a DC battery, preferably a deep-cycle battery that can be charged. In this regard, a battery may be particularly useful at a campsite or athletic field where oftentimes a 110 VAC power outlet is not readily accessible. Consequently, the fan motor may be either an AC or a DC motor, as desired.

Figure 2:
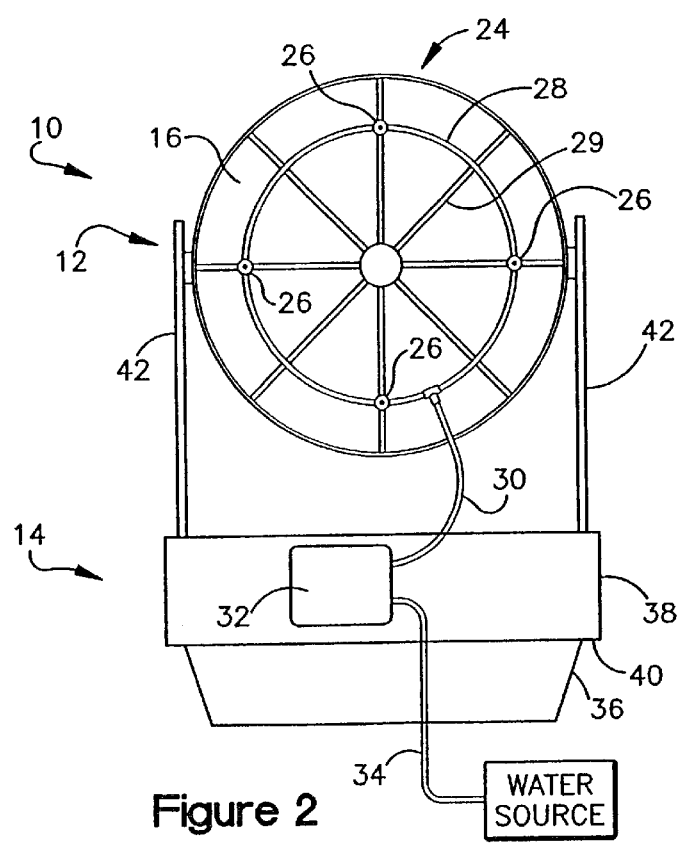
FIG. 2 is a schematic front elevational view of the evaporative cooler apparatus of FIG. 1.

As shown in FIG. 2, the spraying device 24 preferably includes a plurality of misting nozzles 26 and a manifold 28. The misting nozzles 26 are disposed at the downstream end 20 of the housing 16 and, as shown in the preferred illustrated embodiment, there are four equally spaced nozzles 26. The manifold 28 and nozzles 26 are attached to a radially extending support structure 29 to permit radial adjustment thereof or to provide for an additional or different sized manifold 28 and/or nozzles 26. As preferred, the nozzles 26 generally are disposed around the circumference of the housing 16 and directed slightly radially inwardly so as to generate a uniform dispersion or screen of water in front of the discharge end 20 of the cooling apparatus 10.

The manifold 28 extends substantially around the circumference of the housing 16 and conveys the water in equal amounts to the nozzles 26. The nozzles 26 inject or distribute the water preferably in the form of fine water droplets, and even more preferably in the form of a mist, into the air flow path generated by the fan 22, which causes the water to intermix with the air. The resulting mixture is a substantially evaporated air/water mixture that, when discharged from the cooling apparatus 10, cools an area or a subject in the flow path which extends outwardly from the discharge end 20 of the cooling apparatus 10.

The water, which may be, for example, tap water or fresh lake water, is communicated to the misting nozzles 26 via a misting line 30. The misting line 30 is preferably made of a vinyl material such as, for example, the material used for a standard garden hose, to provide flex in the misting line 30. The misting line 30 is connected to a water pump 32 that draws water from an intake conduit 34 in fluid communication with a water source (not shown), such as the barrel type cooler described above. In the illustrated embodiment, the water pump 32 is connected to the base section 14 although it will be appreciated that the pump 32 could alternatively be connected to the fan section 12, this alternative being contemplated as falling within the scope of the present invention. Like the fan 22, the water pump 32 is preferably powered by 110 VAC line power but may be powered by a DC battery. The water pump 32 is preferably a ¼ horsepower pump and operates at a pressure of about 60–70 psi.

The intake conduit 34, like the misting line 30, is preferably made of a vinyl material to provide flex in the conduit 34. As shown in the illustrated embodiment, the intake conduit 34 extends from the water source to the water pump 32. A filter 34 preferably is disposed inside the intake conduit 34 to filter the water communicated therethrough.

Figure 3A:
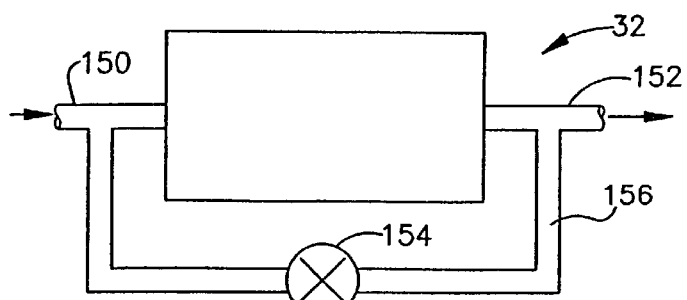
FIGS. 3a–3c are diagrams illustrating in greater detail the pump according to the present invention.

The pump 32 according to a preferred embodiment of the present invention is illustrated in FIG. 3a. The pump 32 has an inlet 150 and an outlet 152, wherein a fluid pressure at the outlet is greater than at the inlet 150. The pump 32 also includes a bypass valve 154 in an external bypass path 156. Alternatively, however, the bypass valve 154 may be located internally within the pump 32. The pump 32 is preferably a multi-chambered pump which distributes the fluid at the inlet 150 in, for example, three separate chambers and sequentially pumps the fluid from the chambers to the outlet 152 per stroke of the pump 32. The pump 32 has an automatic shut-off at a predetermined outlet pump pressure (e.g., about 80–100 PSI) which causes the pump 32 to turn off when a pressure in the pump 32 exceeds the predetermined level. Since the pump 32 is capable of providing about 300 PSI before its motor stops, and the pump 32 is driving the nozzles 24 which have a modest flow rate of, for example, about 0.5–0.75 gallon/hour, the pressure at the outlet 152 increases, causing the pump 32 to turn off when the predetermined shut-off pressure threshold is reached. After the pressure at the outlet 152 decreases, the pump 32 automatically turns back on. Macroscopically then, the fluid at the outlet 152 appears to be pulsating which is undesirable. The bypass valve 154 operates to substantially reduce or eliminate the pulsing at the outlet 152 in the following manner.

The bypass valve 154 has a threshold bypass pressure which is preferably less than the desired operating fluid pressure (e.g., about 45 PSI). As the pressure at the outlet 152 increases toward the cut-off pressure, the threshold bypass pressure threshold is reached, at which time the bypass valve 154 opens and provides a direct fluid flow path from the inlet 150 to the outlet 152 via the bypass path 156. The bypass valve 154 is preferably designed to fully open at the desired operating fluid pressure (e.g., about 60 PSI) at which point the fluid provided to the nozzles 24 is provided primarily through the bypass valve 154 while the fluid within the pump 32 recirculates internally. Because the fluid flow is through the bypass valve 154, the cut-off pressure is not reached and the pump 32 no longer automatically turns on and off in a periodic manner. Thus the pulsation at the outlet 152 is reduced or eliminated altogether.

Figure 3B:
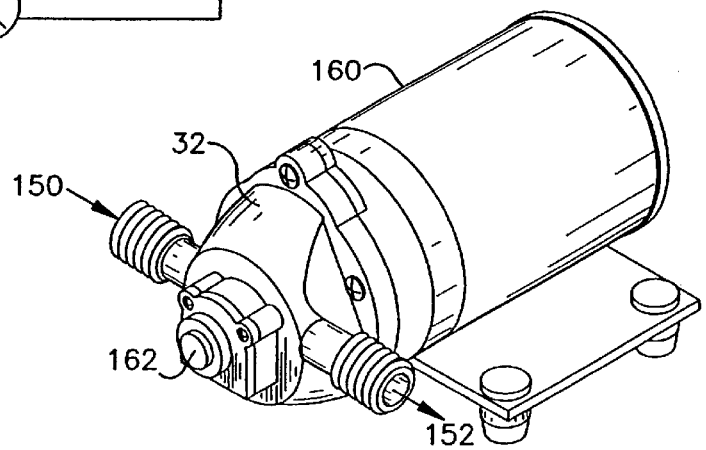
Figure 3C:
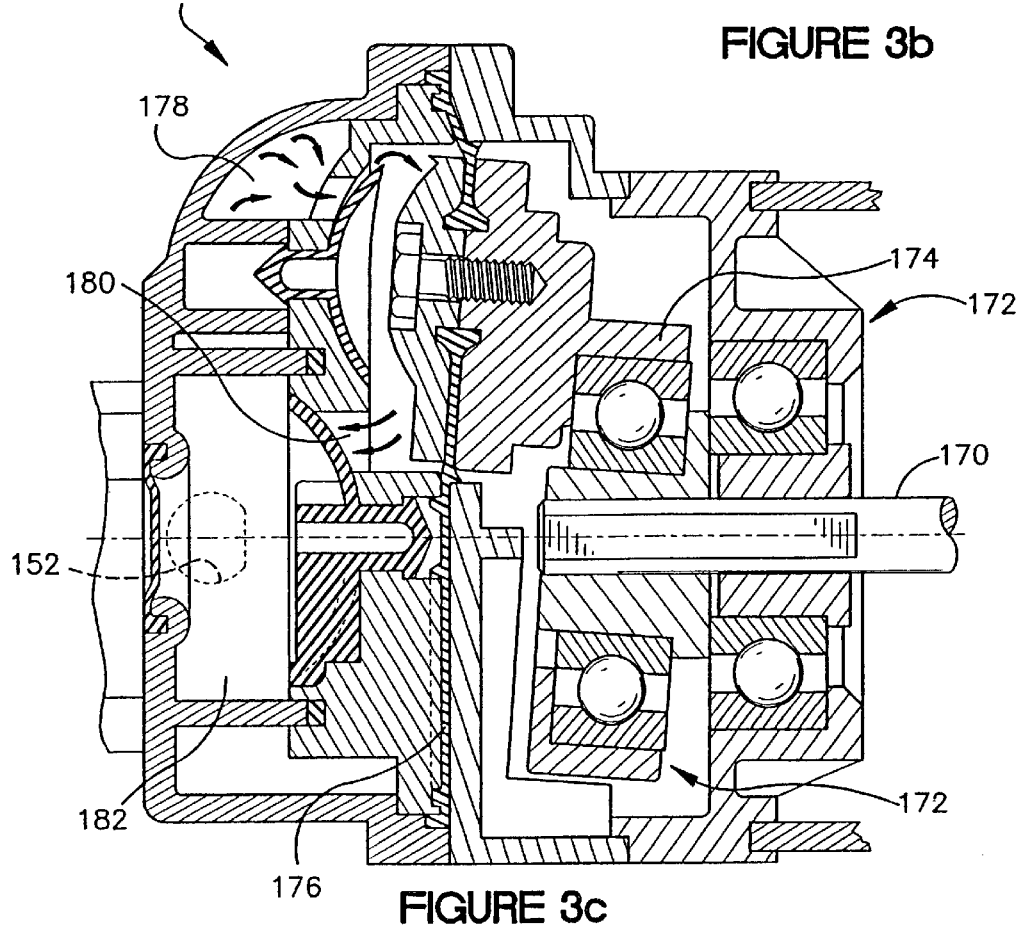

FIGS. 3b and 3c are a perspective view and a cross section view of an exemplary pump 32 according to the present invention. Such a pump 32 is described in a substantial amount of detail in, for example, U.S. Pat. No. 4,610,605 entitled "Triple Discharge Pump" which is incorporated by reference herein in its entirety. The pump 32 of FIG. 3b includes the inlet 150 and the outlet 152. The pump 32 is driven by a motor 160 which is controlled by a pressure switch 162 to activate and deactivate the motor 160 based on the pressure at the outlet 152, as described above in conjunction with FIG. 3a. A bypass valve (not shown) is located internally within the pump 32 between the inlet and the outlet 152 such that when the bypass valve is closed, the pump 32 operates in a non-bypass mode and the fluid passes from the inlet to the outlet through the three chambers. When the bypass valve is open, a leak exists between the inlet 150 and the outlet 152 and fluid passes therethrough.

The pump 32, according to an exemplary embodiment of the present invention, is illustrated in greater detail in FIG. 3c. The pump 32 is a three chambered pump which is driven by an output shaft 170 of the motor 160. The pump 32 has three internal inlet valves and one common outlet valve and the valves are positioned to check one another when in operation. The pump 32 creates a void in each chamber by means of a pair of bearings 172 and a wobbler assembly 174 that nutates with the shaft 170 which flexes a diaphragm 176 to create a void in one of the inlet chambers 178. Atmospheric pressure then pushes fluid into the inlet chamber 178 and the inlet valve associated with the chamber 178 closes; the fluid is trapped until the wobbler assembly 174 nutates which in turn forces the fluid into an outlet chamber 180 and then into a common outlet chamber 182. This occurs separately in three chambers per one rotation of a shaft 170 driven by the motor 160.

According to the present invention, a bypass valve (not shown) is utilized in the pump of FIG. 3c. In such an exemplary arrangement, the outlet valve hole for each chamber leading to the common outlet chamber 182 is sealed with a poppet which is held in place by a spring. The force or spring rate of the spring thus determines the bypass pressure at which the bypass valve opens. The bypass valve is activated by the outlet pressure. When the outlet pressure matches the spring force, the poppet begins to lift off its seat, thus providing a direct leak between the inlet 150 and the outlet 152 of the pump 32. When the bypass valve is utilized, the pressure switch 162 of FIG. 3b is not activated to turn the pump off and the fluid is provided to the outlet 152 in a substantially continuous, non-pulsating manner. Thus the pump 32 of the present invention greatly simplifies and reduces the cost of the cooling system by eliminating a need for an accumulator.

Referring again to FIGS. 1 and 2, in operation, the fan 22 pushes ambient air through the housing 16 to the downstream end 20 where it is discharged outwardly therefrom. Meanwhile, water is drawn from the water source via the water pump 32 and communicated to the misting line 30, the manifold 28, and to the nozzles 26, where the water is injected as fine water droplets into the ambient air flow path generated by the fan 22. The fine water droplets or mist are evaporated into the ambient air flow path thereby causing evaporation of the water which, in turn, cools the flowing air.

Not being bound by theory, the temperature and humidity of the incoming ambient air will affect the rate at which the water is absorbed into the air. In this regard, ambient air will cool more rapidly and in greater quantities by evaporation in dry air than by evaporation in air with a relatively higher humidity. The temperature of the water will also have an effect on the discharge temperature of the cooled air. Thus, hotter water will slow down the evaporation process whereas colder water, for example, ice water, will speed up the evaporation process and provide cooler air. In this regard, it is advantageous to obtain the water from a water source that is maintained at a cool temperature.

Referring more closely now to the base, or adapter, section 14 of the evaporative cooling apparatus 10, it is seen that the base section 14 preferably includes a plug shape, or inverted frustoconical shape bottom portion 36 and a disc shape upper portion 38 extending slightly outwardly from the bottom portion 36 so as to form a circumferential shoulder 40. Because of its shape, the bottom portion 36 will easily seat within, or "edge" into, a variety of different sized conventional barrel type water and/or food coolers having a round shaped opening. If desired, the shoulder 40 may be sized and dimensioned so that it rests on a perimeter of the opening of the water cooler.

Of course, the base section 14 may be sized and dimensioned according to any type of standard sized water cooler and need not be limited to coolers having round shaped openings. For example, the base section 14 may comprise a generally rectangular shape bottom portion and a slightly wider upper portion. Preferably the bottom portion would include a taper to permit it to be installed in a variety of generally rectangular shape water coolers having a rectangular shape opening. To this end, it will be appreciated that alternative size base sections 14 may be employed to accomplish the object of the invention of mating the base section 14 to an "every-day" water cooler to form a portable evaporative cooling apparatus and such alternatives are contemplated as falling within the scope of the present invention.

Because the base section 14 may be used universally with a variety of different sized water coolers, a user can select an appropriately sized water cooler to fit the cooling requirements of a particular use of application. For example, the operating time of the evaporative cooling apparatus 10, we well as the frequency at which the water cooler is refilled, will be a function of the size and/or capacity of the water cooler. Thus, for longer periods of use, or use during the daytime, a relatively larger size water cooler may be used and, likewise, if a shorter operating time is desired, a relatively smaller size water cooler may be employed.

The use of a water and/or food cooler as a water source for the portable evaporative cooling apparatus 10 in accordance with the present invention provides advantages over previous cooling apparatuses. In particular, for example, a water cooler is self-contained, permitting it to be separately transported from the remainder of the evaporative cooling apparatus 10. This may be desirable, for example, during heavy use of the cooling apparatus 10 wherein the water source must be frequently replenished. In addition, a water and/or food cooler is adapted to keep the water therein at a cool temperature, or at least at a constant temperature. Storing the water in a water cooler may also prevent spillage during transportation thereof since most conventional coolers are equipped with a lid or the like.

Referring again to the Figures in general, together the base section 14 and fan section 12 form a support structure for the evaporative cooling apparatus 10. As preferred, the fan section 12 is connected to the base section 14 via suitable connecting fasteners, for example, a pair of parallel support members 42 disposed adjacent the fan section 12 and extending downward to the base section 14 for connection thereto. Preferably the support members 42 are fixedly connected to the base section 14 and pivotally connected to the fan section 12 to permit the downstream end 20 of the fan section 12 to be raised and lowered as needed to control the direction of cooled air flow discharged from the cooling apparatus 10.

As can be appreciate by the foregoing, the present invention provides a portable and universally applicable evaporative cooling apparatus 10. The versatility of the cooling apparatus 10 enables it to be used in a variety of applications and environments, including both indoor and outdoor settings, to achieve convenient and easy-to-set-up cooling.

Although the invention has been shown and described with respect to certain preferred embodiments, equivalent alterations and modifications will occur to others skilled in the art upon reading the understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (ie., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A portable evaporative cooling apparatus for retrofitting with a liquid storage apparatus, comprising:

a fluid stream generation system for generating a stream of fluid;

a spraying system for dispersing an evaporative liquid into the fluid stream generated by the fluid stream generation system for evaporation thereof;

a support structure for supporting the fluid stream generation system and the spraying system, respectively, and operable to cooperatively engage the liquid storage apparatus, wherein the liquid storage apparatus comprises a water cooler, and wherein the support structure is sized and dimensioned to cooperatively engage the water cooler.

2. The apparatus of claim 1, wherein the fluid stream generation system comprises a fan.

3. The apparatus of claim 1, wherein the fluid stream comprises a path of air.

4. The apparatus of claim 1, wherein the evaporative liquid comprises water.

* * * * *

UNITED STATES PATENT AND TRADEMARK OFFICE
CERTIFICATE OF CORRECTION

PATENT NO.   : 6,367,278 B1  
DATED        : April 9, 2002  
INVENTOR(S)  : Christopher J. Strussion and Thomas Strussion Page 1 of 1

It is certified that error appears in the above-identified patent and that said Letters Patent is hereby corrected as shown below:

Column 7,
Line 20, please replace the word "edge" with the word -- wedge --.

Signed and Sealed this

Eighteenth Day of June, 2002

Attest:

Attesting Officer

JAMES E. ROGAN
Director of the United States Patent and Trademark Office